US007562012B1

(12) United States Patent
Wold et al.

(10) Patent No.: US 7,562,012 B1
(45) Date of Patent: Jul. 14, 2009

(54) METHOD AND APPARATUS FOR CREATING A UNIQUE AUDIO SIGNATURE

(75) Inventors: Erling H. Wold, El Cerrito, CA (US); Thomas L. Blum, San Francisco, CA (US); Douglas F. Keislar, Berkeley, CA (US); James A. Wheaton, Fairfax, CA (US)

(73) Assignee: Audible Magic Corporation, Los Gatos, CA (US)

( * ) Notice: Subject to any disclaimer, the term of this patent is extended or adjusted under 35 U.S.C. 154(b) by 748 days.

(21) Appl. No.: 09/706,227

(22) Filed: Nov. 3, 2000

(51) Int. Cl.
*G06F 15/00* (2006.01)

(52) U.S. Cl. .................................... 704/200; 704/200.1

(58) Field of Classification Search ............. 704/210.1, 704/270, 500–504, 200, 200.1
See application file for complete search history.

(56) References Cited

U.S. PATENT DOCUMENTS

| | | | | |
|---|---|---|---|---|
| 3,919,479 A | | 11/1975 | Moon et al. | 179/1 SB |
| 4,230,990 A | | 10/1980 | Lert, Jr. et al. | 455/67 |
| 4,449,249 A | | 5/1984 | Price | |
| 4,450,531 A | | 5/1984 | Kenyon et al. | 364/604 |
| 4,677,455 A | | 6/1987 | Okajima | 357/38 |
| 4,677,466 A | | 6/1987 | Lert, Jr. et al. | 358/84 |
| 4,739,398 A | | 4/1988 | Thomas et al. | 358/84 |
| 4,843,562 A | | 6/1989 | Kenyon et al. | 364/487 |
| 4,918,730 A | | 4/1990 | Schulze | 381/43 |
| 5,210,820 A | | 5/1993 | Kenyon | 395/2 |
| 5,247,688 A | | 9/1993 | Ishigami | |
| 5,283,819 A | | 2/1994 | Glick et al. | 379/90 |
| 5,327,521 A | * | 7/1994 | Savic et al. | 704/272 |
| 5,437,050 A | | 7/1995 | Lamb et al. | 455/2 |
| 5,442,645 A | | 8/1995 | Ugon et al. | |
| 5,504,518 A | | 4/1996 | Ellis et al. | |
| 5,581,658 A | | 12/1996 | O'Hagan et al. | 395/22 |
| 5,588,119 A | | 12/1996 | Vincent et al. | |
| 5,612,974 A | | 3/1997 | Astrachan | |
| 5,613,004 A | | 3/1997 | Cooperman et al. | |

(Continued)

FOREIGN PATENT DOCUMENTS

EP 0349106 A1 1/1990

(Continued)

OTHER PUBLICATIONS

L. Baum et al., A Maximization Technique Occurring in the Statistical Analysis of Probabilistic Functions of Markov Chaims, The Annals of Mathematical Statistics., vol. 41, No. 1 pp. 164-171, 1970.

(Continued)

*Primary Examiner*—Michael N Opsasnick
(74) *Attorney, Agent, or Firm*—Blakely Sokoloff Taylor & Zafman LLP

(57) ABSTRACT

A method and apparatus for creating a signature of a sampled work in real-time is disclosed herein. Unique signatures of an unknown audio work are created by segmenting a file into segments having predetermined segment and hop sizes. The signature then may be compared against reference signatures. One aspect may be characterized in that the hop size of the sampled work signature is less than the hop size of reference signatures. A method for identifying an unknown audio work is also disclosed.

8 Claims, 7 Drawing Sheets

Present Invention

U.S. PATENT DOCUMENTS

| | | | |
|---|---|---|---|
| 5,638,443 A | 6/1997 | Stefik et al. | |
| 5,692,213 A | 11/1997 | Goldberg et al. | |
| 5,701,452 A | 12/1997 | Siefert | |
| 5,710,916 A | 1/1998 | Barbara et al. | |
| 5,724,605 A | 3/1998 | Wissner | |
| 5,732,193 A | 3/1998 | Aberson | |
| 5,850,388 A | 12/1998 | Anderson et al. | |
| 5,918,223 A * | 6/1999 | Blum et al. | 707/1 |
| 5,924,071 A | 7/1999 | Morgan et al. | |
| 5,930,369 A | 7/1999 | Cox et al. | |
| 5,949,885 A | 9/1999 | Leighton | |
| 5,959,659 A | 9/1999 | Dokic | |
| 5,983,176 A | 11/1999 | Hoffert et al. | 704/233 |
| 6,006,183 A | 12/1999 | Lai et al. | |
| 6,006,256 A | 12/1999 | Zdepski et al. | 709/217 |
| 6,011,758 A | 1/2000 | Dockes et al. | 369/30 |
| 6,026,439 A | 2/2000 | Chowdhury et al. | 709/233 |
| 6,044,402 A | 3/2000 | Jacobson et al. | 709/225 |
| 6,067,369 A | 5/2000 | Kamei | |
| 6,088,455 A | 7/2000 | Logan et al. | |
| 6,092,040 A * | 7/2000 | Voran | 704/228 |
| 6,096,961 A | 8/2000 | Bruti et al. | 84/609 |
| 6,118,450 A | 9/2000 | Proehl et al. | 345/349 |
| 6,192,340 B1 | 2/2001 | Abecassis | 704/270 |
| 6,195,693 B1 | 2/2001 | Berry et al. | |
| 6,229,922 B1 | 5/2001 | Sasakawa et al. | |
| 6,243,615 B1 | 6/2001 | Neway et al. | |
| 6,243,725 B1 | 6/2001 | Hempleman et al. | |
| 6,253,193 B1 | 6/2001 | Ginter et al. | 705/57 |
| 6,253,337 B1 | 6/2001 | Maloney et al. | 714/38 |
| 6,279,010 B1 | 8/2001 | Anderson | |
| 6,279,124 B1 | 8/2001 | Brouwer et al. | |
| 6,285,596 B1 | 9/2001 | Miura et al. | |
| 6,330,593 B1 | 12/2001 | Roberts et al. | |
| 6,345,256 B1 | 2/2002 | Milsted et al. | |
| 6,374,260 B1 | 4/2002 | Hoffert et al. | |
| 6,385,596 B1 | 5/2002 | Wiser et al. | |
| 6,418,421 B1 | 7/2002 | Hurtado et al. | |
| 6,422,061 B1 | 7/2002 | Sunshine et al. | |
| 6,438,556 B1 | 8/2002 | Malik et al. | |
| 6,449,226 B1 | 9/2002 | Kumagai | |
| 6,452,874 B1 | 9/2002 | Otsuka et al. | |
| 6,453,252 B1 | 9/2002 | Laroche | |
| 6,460,050 B1 | 10/2002 | Pace et al. | |
| 6,463,508 B1 | 10/2002 | Wolf et al. | |
| 6,477,704 B1 | 11/2002 | Cremia | |
| 6,487,641 B1 | 11/2002 | Cusson et al. | |
| 6,490,279 B1 | 12/2002 | Chen et al. | |
| 6,496,802 B1 | 12/2002 | van Zoest et al. | |
| 6,526,411 B1 | 2/2003 | Ward | |
| 6,542,869 B1 * | 4/2003 | Foote | 704/500 |
| 6,550,001 B1 | 4/2003 | Corwin et al. | |
| 6,550,011 B1 | 4/2003 | Sims, III | |
| 6,591,245 B1 | 7/2003 | Klug | |
| 6,609,093 B1 | 8/2003 | Gopinath et al. | |
| 6,609,105 B2 | 8/2003 | Story et al. | |
| 6,628,737 B1 * | 9/2003 | Timus | 375/368 |
| 6,636,965 B1 | 10/2003 | Beyda et al. | |
| 6,654,757 B1 | 11/2003 | Stern | |
| 6,732,180 B1 | 5/2004 | Hale et al. | |
| 6,771,885 B1 | 8/2004 | Agnihotri et al. | |
| 6,834,308 B1 | 12/2004 | Ikezoye et al. | |
| 6,947,909 B1 | 9/2005 | Hoke, Jr. | |
| 6,968,337 B2 * | 11/2005 | Wold | 707/100 |
| 7,043,536 B1 | 5/2006 | Philyaw et al. | |
| 7,047,241 B1 | 5/2006 | Erickson | |
| 7,058,223 B2 | 6/2006 | Cox | |
| 7,181,398 B2 | 2/2007 | Thong et al. | |
| 7,269,556 B2 | 9/2007 | Kiss et al. | |
| 7,281,272 B1 | 10/2007 | Rubin et al. | |
| 7,349,552 B2 | 3/2008 | Levy et al. | |
| 7,363,278 B2 | 4/2008 | Schmelzer et al. | |
| 2001/0013061 A1 | 8/2001 | DeMartin et al. | |
| 2001/0027522 A1 | 10/2001 | Saito | |
| 2001/0034219 A1 | 10/2001 | Hewitt et al. | |
| 2001/0037304 A1 | 11/2001 | Paiz | |
| 2001/0056430 A1 | 12/2001 | Yankowski | |
| 2002/0049760 A1 | 4/2002 | Scott et al. | |
| 2002/0064149 A1 | 5/2002 | Elliott et al. | |
| 2002/0082999 A1 | 6/2002 | Lee et al. | |
| 2002/0087885 A1 | 7/2002 | Peled et al. | |
| 2002/0123990 A1 | 9/2002 | Abe et al. | |
| 2002/0133494 A1 | 9/2002 | Goedken | |
| 2002/0152262 A1 | 10/2002 | Arkin et al. | |
| 2002/0156737 A1 | 10/2002 | Kahn et al. | |
| 2002/0158737 A1 | 10/2002 | Yokoyama | |
| 2002/0186887 A1 | 12/2002 | Rhoads | |
| 2002/0198789 A1 | 12/2002 | Waldman | |
| 2003/0014530 A1 | 1/2003 | Bodin et al. | |
| 2003/0018709 A1 | 1/2003 | Schrempp et al. | |
| 2003/0023852 A1 | 1/2003 | Wold | |
| 2003/0033321 A1 | 2/2003 | Schrempp et al. | |
| 2003/0037010 A1 | 2/2003 | Schmelzer | |
| 2003/0061352 A1 | 3/2003 | Bohrer et al. | |
| 2003/0061490 A1 | 3/2003 | Abajian | |
| 2003/0095660 A1 | 5/2003 | Lee et al. | |
| 2003/0135623 A1 | 7/2003 | Schrempp et al. | |
| 2003/0191719 A1 | 10/2003 | Ginter et al. | |
| 2003/0195852 A1 | 10/2003 | Campbell et al. | |
| 2004/0008864 A1 | 1/2004 | Watson et al. | |
| 2004/0010495 A1 | 1/2004 | Kramer et al. | |
| 2004/0053654 A1 | 3/2004 | Kokumai et al. | |
| 2004/0073513 A1 | 4/2004 | Stefik et al. | |
| 2004/0089142 A1 | 5/2004 | Georges et al. | |
| 2004/0133797 A1 | 7/2004 | Arnold | |
| 2004/0148191 A1 | 7/2004 | Hoke, Jr. | |
| 2004/0163106 A1 | 8/2004 | Schrempp et al. | |
| 2004/0201784 A9 | 10/2004 | Dagtas et al. | |
| 2005/0021783 A1 | 1/2005 | Ishii | |
| 2005/0044189 A1 | 2/2005 | Ikezoye et al. | |
| 2005/0154678 A1 | 7/2005 | Schmelzer | |
| 2005/0154680 A1 | 7/2005 | Schmelzer | |
| 2005/0154681 A1 | 7/2005 | Schmelzer | |
| 2005/0216433 A1 | 9/2005 | Bland et al. | |
| 2005/0267945 A1 | 12/2005 | Cohen et al. | |
| 2006/0034177 A1 | 2/2006 | Schrempp | |
| 2006/0062426 A1 | 3/2006 | Levy et al. | |
| 2007/0074147 A1 | 3/2007 | Wold | |
| 2007/0078769 A1 | 4/2007 | Way | |
| 2008/0008173 A1 | 1/2008 | Kanevsky et al. | |
| 2008/0154730 A1 | 6/2008 | Schmelzer et al. | |

FOREIGN PATENT DOCUMENTS

| | | | |
|---|---|---|---|
| EP | 0402210 | A1 | 6/1990 |
| EP | 0517405 | A2 | 5/1992 |
| EP | 0689316 | A2 | 12/1995 |
| EP | 0731446 | | 9/1996 |
| EP | 0859503 | | 8/1998 |
| EP | 0459046 | | 4/1999 |
| EP | 1 354 276 | B1 | 12/2007 |
| WO | WO 96/36163 | A3 | 11/1996 |
| WO | WO 98/20672 | A3 | 5/1998 |
| WO | WO 00/05650 | A1 | 2/2000 |
| WO | WO 00/39954 | A1 | 7/2000 |
| WO | WO 00/63800 | A1 | 10/2000 |
| WO | WO 01/23981 | A1 | 4/2001 |
| WO | WO 01/62004 | | 8/2001 |
| WO | WO 02/03203 | | 1/2002 |
| WO | WO 02/15035 | A2 | 2/2002 |
| WO | WO 02/37316 | A2 | 5/2002 |
| WO | WO 02/082271 | A1 | 10/2002 |
| WO | WO 03/007235 | A1 | 1/2003 |
| WO | WO 03/009149 | A1 | 1/2003 |

| | | | |
|---|---|---|---|
| WO | WO 03/036496 | A1 | 5/2003 |
| WO | WO 03/067459 | A1 | 8/2003 |
| WO | WO 03/091990 | A1 | 11/2003 |
| WO | WO 2004/044820 | A1 | 5/2004 |
| WO | WO 2004/070558 | A2 | 8/2004 |
| WO | WO 2006/015168 | A2 | 2/2006 |

OTHER PUBLICATIONS

A. P. Dempster et al. "Maximum Likelihood from Incomplete Data via the $EM$ Algorithm", Journal of the Royal Statistical Society, Series B (Methodological), vol. 39, Issue 1, pp. 1-38, 1977.

D. Reynolds et al., "Robust Text-Independent Speaker Identification Using Gaussian Mixture Speaker Models", IEEE Transactions on Speech and Audio Processing, vol. 3, No. 1, pp. 72-83, Jan. 1995.

PCT International Search Report, PCT/US 01/50295, mailed May 14, 2003, 5 pages.

Beritelli, F., et al., "Multilayer Chaotic Encryption for Secure Communications in packet switching Networks," IEEE, vol. Aug. 2, 2000, pp. 1575-1582.

Blum, T., Keislar D., Wheaton, J., and Wold, E., "Audio Databases with Content-Based Retrieval," Prodeedings of the 1995 International Joint Conference on Artificial Intelligence (IJCAI) Workshop on Intelligent Multimedia Information Retrieval, 1995.

Breslin, Pat, et al., Relatable Website, "Emusic uses Relatable's open source audio recongnition solution, TRM, to signature its music catabblog for MusicBrainz database," http://www.relatable.com/news/pressrelease/001017.release.html, Oct. 17, 2000.

Cosi, P., De Poli, G., Prandoni, P., "Timbre Characterization with Mel-Cepstrum and Neural Nets," Proceedings of the 1994 International Computer Music Conference, pp. 42-45, San Francisco, No date.

Feiten, B. and Gunzel, S., "Automatic Indexing of a Sound Database Using Self-Organizing Neural Nets," Computer Music Journal, 18:3, pp. 52-65, Fall 1994.

Fischer, S., Leinhart, R., and Effelsberg, W., "Automatic Recognition of Film Genres," Reihe Informatik, Jun. 1995, Universitat Mannheim, Praktische Informatik IV, L15, 16, D-68131 Mannheim.

Foote, J., "Similarity Measure for Automatic Audio Classification," Institute of Systems Science, National University of Singapore, 1977, Singapore.

Gonzalez, R. and Melih, K., "Content Based Retrieval of Audio," The Institute for Telecommunication Research, University of Wollongong, Australia, No date.

Haitsma, J., et al., "Robust Audio Hashing for Content Identification", CBMI 2001, Second International Workshop on Content Based Multimedia and Indexing, Brescia, Italy, Sep. 19-21, 2001.

Kanth, K.V. et al. "Dimensionality Reduction or Similarity Searching in Databases," Computer Vision and Image understanding, vol. 75, Nos. 1/2 Jul./Aug. 1999, pp. 59-72, Academic Press. Santa Barbara, CA, USA.

Keislar, D., Blum, T., Wheaton, J., and Wold, E., "Audio Analysis for Content-Based Retrieval" Proceedings of the 1995 International Computer Music Conference.

Ohtsuki, K., et al. , "Topic extraction based on continuos speech recognition in broadcase-news speech," Proceedings IEEE Workshop on Automated Speech Recognition and Understanding, 1997, pp. 527-534, N.Y., N.Y., USA.

Packethound Tech Specs, www.palisdesys.com/products/packethount/tck specs/prod Phtechspecs.shtml, 2002.

"How does PacketHound work?", www.palisdesys.com/products/packethound/how_does_it_work/prod_Pghhow.shtml 2002.

Pellom, B. et al., "Fast Likelihood Computation Techniques in Nearest-Neighbor search for Continuous Speech Recognition.", *IEEE Signal Processing Letters*, vol. 8, pp. 221-224 Aug. 2001.

Ken C. Pohlmann, "Principles of Digital Audio", SAMS/A Division of Prentice Hall Computer Publishing.

Scheirer, E., Slaney, M., "Construction and Evaluation of a Robust Multifeature Speech/Music Discriminator," PP. 1-4, Proceedings of ICASSP-97, Apr. 2-24, Munich, Germany.

Scheirer, E.D., "Tempo and Beat Analysis of Acoustic Musical Signals," Machine Listening Group, E15-401D MIT Media Laboratory, pp. 1-21, Aug. 8, 1997, Cambridge, MA..

Schneier, Bruce Applied Cryptography, Protocols, Algorithms and Source Code in C, Chapter 2 Protocol Building Blocks, 1996, pp. 30-31.

Smith, Alan J., "Cache Memories," Computer Surveys, Sep. 1982, University of California, Berkeley, California, vol. 14, No. 3, pp. 1-61.

Vertegaal, R. and Bonis, E., "ISEE: An Intuitive Sound Editing Environment," Computer Music Journal, 18:2, pp. 21-22, Summer 1994.

Wang, Yao, et al., "Multimedia Content Analysis," IEEE Signal Processing Magazine, pp. 12-36, Nov. 2000, IEEE Service Center, Piscataway, N.J., USA.

Wold, Erling, et al., "Content Based Classification, Search and Retrieval of Audio," IEEE Multimedia, vol. 3, No. 3, pp. 27-36, 1996 IEEE Service Center, Piscataway, N.J., USA.

Zawodny, Jeremy, D., "A C Program to Compute CDDB discids on Linus and FreeBSD," [internet]http://jeremy.zawodny.com/c/discid-linux-1.3tar.gz, 1 page, Apr. 14, 2001, retrieved July, 17, 2007.

European Patent Application No. 0275234731, Supplementary European Search Report Dated May 8, 2006, 4 pages. (5219P004EP).

European Patent Application No. 02756525.8, Supplementary European Search Report Dated June 28, 2006, 4 pages. (5219P005EP).

European Patent Application No. 02782170, Supplementary European Search Report Dated Feb. 7, 2007, 4 pages. (5219P005XEP).

European Patent Application No. 02725522.3, Supplementary European Search Report Dated May 12, 2006, 2 pages (5219P007EP).

PCT Search Report PCT/US02/10615, International Search Report dated Aug. 7, 2002, 2 pages. (5219P007PCT).

PCT Search Report PCT/US02/33186, International Search Report dated Dec. 16, 2002, pp. 1-4. (5219P005XPCT).

PCT Search Report PCT/US04/02748, International Search Report and Written Opinion dated Aug. 20, 2007, 6 pages. (5219P008PCT).

PCT Search Report PCT/US05/26887, International Search Report dated May 3, 2006, 2 pages. (5219P009PCT).

PCT Search Report PCT/US08/09127, International Search Report dated Oct. 30, 2008, 8 pages. (5219P011PCT).

Office Action for U.S. Appl. No. 09/511,632 () mailed Dec. 4, 2002.

Office Action for U.S. Appl. No. 09/511,632 (P001) mailed May 13, 2003.

Office Action for U.S. Appl. No. 09/511,632 mailed Aug. 27, 2003.

Office Action for U.S. Appl. No. 09/511,632 mailed Feb. 5, 2004.

Notice of Allowance for U.S. Appl. No. 09/511,632 mailed Aug. 10, 2004.

Notice of Allowance for U.S. Appl. No. 10/955,841 mailed Sep. 26, 2006.

Notice of Allowance for U.S. Appl. No. 10/955,841 mailed Mar. 23. 2007.

Notice of Allowance for U.S. Appl. No. 10/955,841 mailed Sep. 11, 2007.

Notice of Allowance for U.S. Appl. No. 10/955,841 mailed Feb. 25, 2008.

Office Action for U.S. Appl. No. 08/897,662 mailed Aug. 13, 1998.

Notice of Allowance for U.S. Appl. No. 08/897,662 mailed Jan. 29, 1999.

Office Action for U.S. Appl. No. 10/192,783 mailed Dec, 13, 2004.

Notice of Allowance for U.S. Appl. No. 10/192,783 mailed Jun. 7, 2005.

Notice of Allowance for U.S. Appl. No. 11/239,543 (P004C) mailed Apr. 23, 2008.

Office Action for U.S. Appl. No. 09/910,680 mailed Nov. 17, 2004.

Office Action for U.S. Appl. No. 09/910,680 mailed May 16, 2005.

Office Action for U.S. Appl. No. 09/910,680 mailed Sep. 29, 2005.

Office Action for U.S. Appl. No. 09/910,680 mailed Jun. 23, 2006.

Office Action for U.S. Appl. No. 09/910,680 mailed Aug. 8, 2006.

Office Action for U.S. Appl. No. 09/910,680 mailed Jan. 25, 2007.

Office Action for U.S. Appl. No. 09/910,680 mailed Dec. 5, 2007.

Office Action for U.S. Appl. No. 09/999,763 mailed Apr. 6, 2005.

Office Action for U.S. Appl. No. 09/999,763 mailed Oct. 6, 2005.

Office Action for U.S. Appl. No. 09/999,763 mailed Aug. 7, 2006.

Office Action for U.S. Appl. No. 09/999,763 mailed Oct. 6, 2006.

Office Action for U.S. Appl. No. 09/999,763 mailed Mar. 7, 2007.

Office Action for U.S. Appl. No. 09/999,763 mailed Aug. 20, 2007.

Office Action for U.S. Appl. No. 09/999,763 mailed Jan. 7, 2008.

Office Action for U.S. Appl. No. 09/999,763 mailed Jun. 27, 2008.

Office Action for U.S. Appl. No. 09/999,763 mailed Dec. 22, 2008.
Office Action for U.S. Appl. No. 10/072,238 mailed May 3, 2005.
Office Action for U.S. Appl. No. 10/072,238 mailed Oct. 25, 2005.
Office Action for U.S. Appl. No. 10/072,238 mailed Apr. 25, 2006.
Audible Magic Office Action for U.S. Appl. No. 10/072,238 mailed Sep. 19, 2007.
Audible Magic Office Action for U.S. Appl. No. 10/072,238 mailed Apr. 7, 2008.
Audible Magic Office Action for U.S. Appl. No. 10/072,238 mailed Oct. 1, 2008.
Audible Magic Office Action for U.S. Appl. No. 11/116,710 mailed Dec. 13, 2004.
Audible Magic Office Action for U.S. Appl. No. 11/116,710 mailed Apr. 8, 2005.
Audible Magic Office Action for U.S. Appl. No. 11/116,710 mailed Oct. 7, 2005.
Audible Magic Office Action for U.S. Appl. No. 11/116,710 mailed Apr. 20, 2006.
Audible Magic Office Action for U.S. Appl. No. 11/116,710 mailed Jul. 31. 2006.
Audible Magic Office Action for U.S. Appl. No. 11/116,710 mailed Jan. 16, 2007.
Audible Magic Notice of Allowance for U.S. Appl. No. 12/042,023 mailed Dec. 29, 2008.
Audible Magic Office Action for U.S. Appl. No. 11/048,307 mailed Aug. 22, 2007.
Audible Magic Office Action for U.S. Appl. No. 11/048,307 mailed May 16, 2008.
Audible Magic Office Action for U.S. Appl. No. 11/048,308 mailed Feb. 25, 2008.
Audible Magic Office Action for U.S. Appl. No. 11/048,338 mailed Apr. 18, 2007.
Audible Magic Office Action for U.S. Appl. No. 11/048,338 mailed Oct. 11, 2007.
Audible Magic Office Action for U.S. Appl. No. 11/048,338 mailed Jan. 14, 2008.
Audible Magic Office Action for U.S. Appl. No. 11/048,338 mailed Jul. 9, 2008.
Audible Magic Office Action for U.S. Appl. No. 11/048,338 mailed Jan. 7, 2009.
Audible Magic Office Action for U.S. Appl. No. 12/035,599 mailed Nov. 17, 2008.
Audible Magic Office Action for U.S. Appl. No. 12/035,609 mailed Dec. 29, 2008.
Audible Magic Office Action for U.s. Appl. No. 10/356,318 mailed May 24, 2006.
Audible Magic Office Action for U.S. Appl. No. 10/356,318 mailed Nov. 2, 2006.
Audible Magic Office Action for U.S. Appl. No. 10/356,318 mailed Apr. 11, 2007.
Audible Magic Office Action for U.S. Appl. No. 10/356,318 mailed Nov. 1, 2007.
Audible Magic Office Action for U.S. Appl. No. 10/356,318 mailed May 9, 2008.
Audible Magic Office Action for U.S. Appl. No. 10/356,318 mailed Jan. 6, 2009.
Audible Magic Office Action for U.S. Appl. No. 11/191,493 mailed Jul. 17, 2008.
Audible Magic Office Action for U.S. Appl. No. 11/191,493 mailed Jan. 9, 2009.

* cited by examiner

Present Invention

Present Invention

Present Invention

Present Invention

Present Invention

Present Invention

Present Invention

METHOD AND APPARATUS FOR CREATING A UNIQUE AUDIO SIGNATURE

BACKGROUND OF THE INVENTION

1. Field of the Invention

The present invention relates to data communications. In particular, the present invention relates to creating a unique audio signature.

2. The Prior Art

Background

Digital audio technology has greatly changed the landscape of music and entertainment. Rapid increases in computing power coupled with decreases in cost have made it possible individuals to generate finished products having a quality once available only in a major studio. Once consequence of modern technology is that legacy media storage standards, such as reel-to-reel tapes, are being rapidly replaced by digital storage media, such as the Digital Versatile Disk (DVD), and Digital Audio Tape (DAT). Additionally, with higher capacity hard drives standard on most personal computers, home users may now store digital files such as audio or video tracks on their home computers.

Furthermore, the Internet has generated much excitement, particularly among those who see the Internet as an opportunity to develop new avenues for artistic expression and communication. The Internet has become a virtual gallery, where artists may post their works on a Web page. Once posted, the works may be viewed by anyone having access to the Internet.

One application of the Internet that has received considerable attention is the ability to transmit recorded music over the Internet. Once music has been digitally encoded into a file, the file may be both downloaded by users for play, or broadcast ("streamed") over the Internet. When files are streamed, they may be listened to by Internet users in a manner much like traditional radio stations.

Given the widespread use of digital media, digital audio files, or digital video files containing audio information, may need to be identified. The need for identification of digital files may arise in a variety of situations. For example, an artist may wish to verify royalty payments or generate their own Arbitron®-like ratings by identifying how often their works are being streamed or downloaded. Additionally, users may wish to identify a particular work. The prior art has made efforts to create methods for identifying digital audio works.

However, systems of the prior art suffer from certain disadvantages. For example, prior art systems typically create a reference signature by examining the copyrighted work as a whole, and then creating a signature based upon the audio characteristics of the entire work. However, examining a work in total can result in a signature may not accurately represent the original work. Often, a work may have distinctive passages which may not be reflected in a signature based upon the total work. Furthermore, often works are electronically processed prior to being streamed or downloaded, in a manner that may affect details of the work's audio characteristics, which may result in prior art systems missing the identification of such works. Examples of such electronic processing include data compression and various sorts of audio signal processing such as equalization.

Hence, there exists a need to provide a system which overcomes the disadvantages of the prior art.

BRIEF DESCRIPTION OF THE INVENTION

The present invention relates to data communications. In particular, the present invention relates to creating a unique audio signature.

A method for creating a signature of a sampled work in real-time is disclosed herein. One aspect of the present invention comprises: receiving a sampled work; segmenting the sampled work into a plurality of segments, the segments having predetermined segment and hop sizes; creating a signature of the sampled work based upon the plurality of segments; and storing the sampled work signature. Additional aspects include providing a plurality of reference signatures having a segment size and a hop size. An additional aspect may be characterized in that the hop size of the sampled work signature is less than the hop size of the reference signatures.

An apparatus for creating a signature of a sampled work in real-time is also disclosed. In a preferred aspect, the apparatus comprises: means for receiving a sampled work; means for segmenting the sampled work into a plurality of segments, the segments having predetermined segment and hop sizes; means for creating a signature of the sampled work based upon the plurality of segments; and storing the sampled work signature. Additional aspects include means for providing a plurality of reference signatures having a segment size and a hop size. An additional aspect may be characterized in that the hop size of the sampled work signature is less than the hop size of the reference signatures.

A method for identifying an unknown audio work is also disclosed. In another aspect of the present invention, the method comprises: providing a plurality of reference signatures each having a segment size and a hop size; receiving a sampled work; creating a signature of the sampled work, the sampled work signature having a segment size and a hop size; storing the sampled work signature; comparing the sampled work signature to the plurality of reference signatures to determine whether there is a match; and wherein the method is characterized in that the hop size of the sampled work signature is less than the hop size of the reference signatures.

Further aspects of the present invention include creating a signature of the sampled work by calculating segment feature vectors for each segment of the sampled work. The segment feature vectors may include MFCCs calculated for each segment.

BRIEF DESCRIPTION OF THE DRAWING FIGURES

DETAILED DESCRIPTION OF PREFERRED EMBODIMENTS

Persons of ordinary skill in the art will realize that the following description of the present invention is illustrative only and not in any way limiting. Other embodiments of the invention will readily suggest themselves to such skilled persons having the benefit of this disclosure.

It is contemplated that the present invention may be embodied in various computer and machine-readable data structures. Furthermore, it is contemplated that data structures embodying the present invention will be transmitted across computer and machine-readable media, and through communications systems by use of standard protocols such as those used to enable the Internet and other computer networking standards.

The invention further relates to machine-readable media on which are stored embodiments of the present invention. It is contemplated that any media suitable for storing instructions related to the present invention is within the scope of the present invention. By way of example, such media may take the form of magnetic, optical, or semiconductor media.

The present invention may be described through the use of flowcharts. Often, a single instance of an embodiment of the present invention will be shown. As is appreciated by those of ordinary skill in the art, however, the protocols, processes, and procedures described herein may be repeated continuously or as often as necessary to satisfy the needs described herein. Accordingly, the representation of the present invention through the use of flowcharts should not be used to limit the scope of the present invention.

The present invention may also be described through the use of web pages in which embodiments of the present invention may be viewed and manipulated. It is contemplated that such web pages may be programmed with web page creation programs using languages standard in the art such as HTML or XML. It is also contemplated that the web pages described herein may be viewed and manipulated with web browsers running on operating systems standard in the art, such as the Microsoft Windows® and Macintosh® versions of Internet Explorer® and Netscape®. Furthermore, it is contemplated that the functions performed by the various web pages described herein may be implemented through the use of standard programming languages such a Java® or similar languages.

The present invention will first be described in general overview. Then, each element will be described in further detail below.

Figure 1:
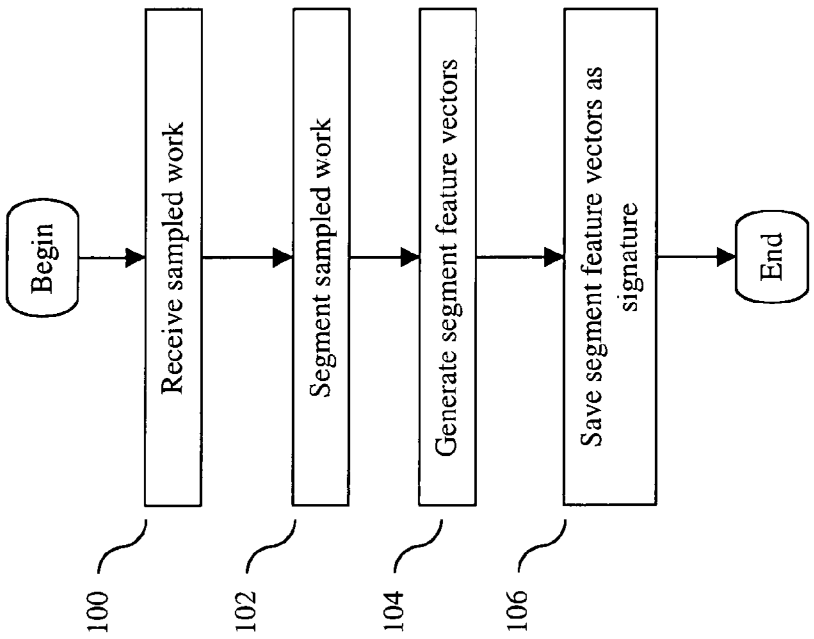
FIG. 1 is a flowchart of a method according to the present invention.

Referring now to FIG. 1, a flowchart is shown which provides a general overview of the present invention. The present invention may be viewed as three steps: 1) receiving a sampled work; 2) segmenting the work; 3) creating signatures of the segments; and 4) storing the signatures of the segments.

Receiving a Sampled Work

Beginning with act 100, a sampled work is provided to the present invention. It is contemplated that the work will be provided to the present invention as a digital audio stream.

It should be understood that if the audio is in analog form, it may be digitized in a manner standard in the art.

Segmenting the Work

After the sampled worked is received, the work is then segmented in act 102. It is contemplated that the sampled work may be segmented into predetermined lengths. Though segments may be of any length, the segments of the present invention are preferably of the same length.

In an exemplary non-limiting embodiment of the present invention, the segment lengths are in the range of 0.5 to 3 seconds. It is contemplated that if one were searching for very short sounds (e.g., sound effects such as gunshots), segments as small as 0.01 seconds may be used in the present invention. Since humans don't resolve audio changes below about 0.018 seconds, segment lengths less than 0.018 seconds may not be useful. On the other hand, segment lengths as high as 30-60 seconds may be used in the present invention. The inventors have found that beyond 30-60 seconds may not be useful, since most details in the signal tend to average out.

Generating Signatures

Next, in act 104, each segment is analyzed to produce a signature, known herein as a segment feature vector. It is contemplated that a wide variety of methods known in the art may be used to analyze the segments and generate segment feature vectors. In an exemplary non-limiting embodiment of the present invention, the segment feature vectors may be created using the method described in U.S. Pat. No. 5,918,223 to Blum, et al, which is incorporated by reference as though set forth fully herein.

Storing the Signatures

In act 106, the segment feature vectors are stored to create a representative signature of the sampled work.

Each above-listed step will now be shown and described in detail.

Figure 2:
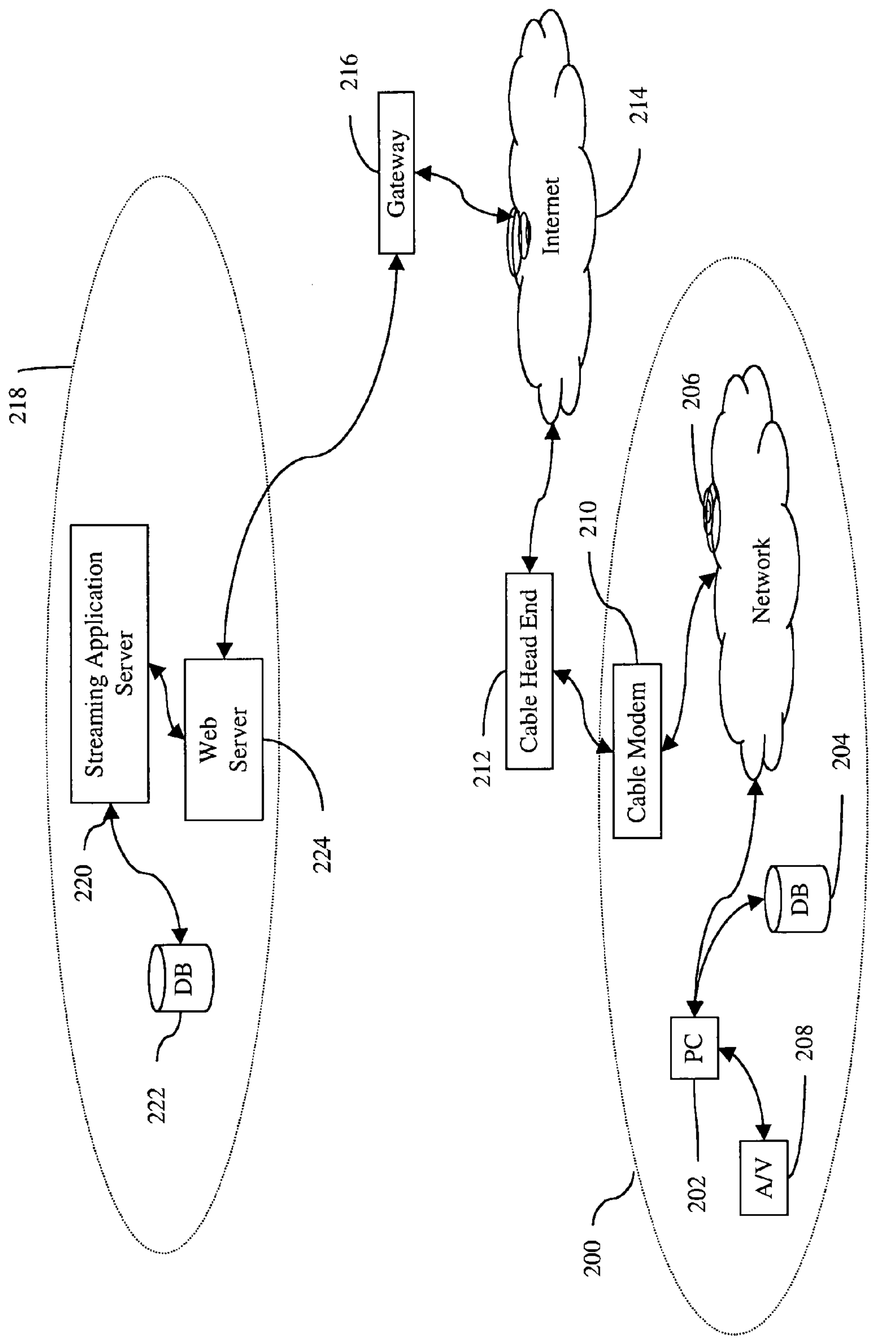
FIG. 2 is a diagram of a system suitable for use with the present invention.

Referring now to FIG. 2, a diagram of a system suitable for use with the present invention is shown. FIG. 2 includes a client system 200. It is contemplated that client system 200 may comprise a personal computer 202 including hardware and software standard in the art to run an operating system such as Microsoft Windows®, MAC OS®, or other operating systems standard in the art. Client system 200 may further include a database 204 for storing and retrieving embodiments of the present invention. It is contemplated that database 204 may comprise hardware and software standard in the art and may be operatively coupled to PC 202. Database 204 may also be used to store and retrieve the works and segments utilized by the present invention.

Client system 200 may further include an audio/video (A/V) input device 208. A/V device 208 is operatively coupled to PC 202 and is configured to provide works to the present invention which may be stored in traditional audio or video formats. It is contemplated that A/V device 208 may comprise hardware and software standard in the art configured to receive and sample audio works (including video containing audio information), and provide the sampled works to the present invention as digital audio files. Typically, the A/V input device 208 would supply raw audio samples in a format such as 16-bit stereo PCM format. A/V input device 208 provides an example of means for receiving a sampled work.

It is contemplated that sampled works may be obtained over the Internet, also. Typically, streaming media over the Internet is provided by a provider, such as provider 218 of FIG. 2. Provider 218 includes a streaming application server 220, configured to retrieve works from database 222 and stream the works in a formats standard in the art, such as Real®, Windows Media®, or QuickTime®. The server then provides the streamed works to a web server 224, which then provides the streamed work to the Internet 214 through a gateway 216. Internet 214 may be any packet-based network standard in the art, such as IP, Frame Relay, or ATM.

To reach the provider 218, the present invention may utilize a cable or DSL head end 212 standard in the art operatively, which is coupled to a cable modem or DSL modem 210 which is in turn coupled to the system's network 206. The network 206 may be any network standard in the art, such as a LAN provided by a PC 202 configured to run software standard in the art.

It is contemplated that the sampled work received by system 200 may contain audio information from a variety of sources known in the art, including, without limitation, radio, the audio portion of a television broadcast, Internet radio, the audio portion of an Internet video program or channel, streaming audio from a network audio server, audio delivered to personal digital assistants over cellular or wireless communication systems, or cable and satellite broadcasts.

Additionally, it is contemplated that the present invention may be configured to receive and compare segments coming from a variety of sources either stored or in real-time. For example, it is contemplated that the present invention may compare a real-time streaming work coming from streaming server 218 or A/V device 208 with a reference segment stored in database 204.

Figure 3:
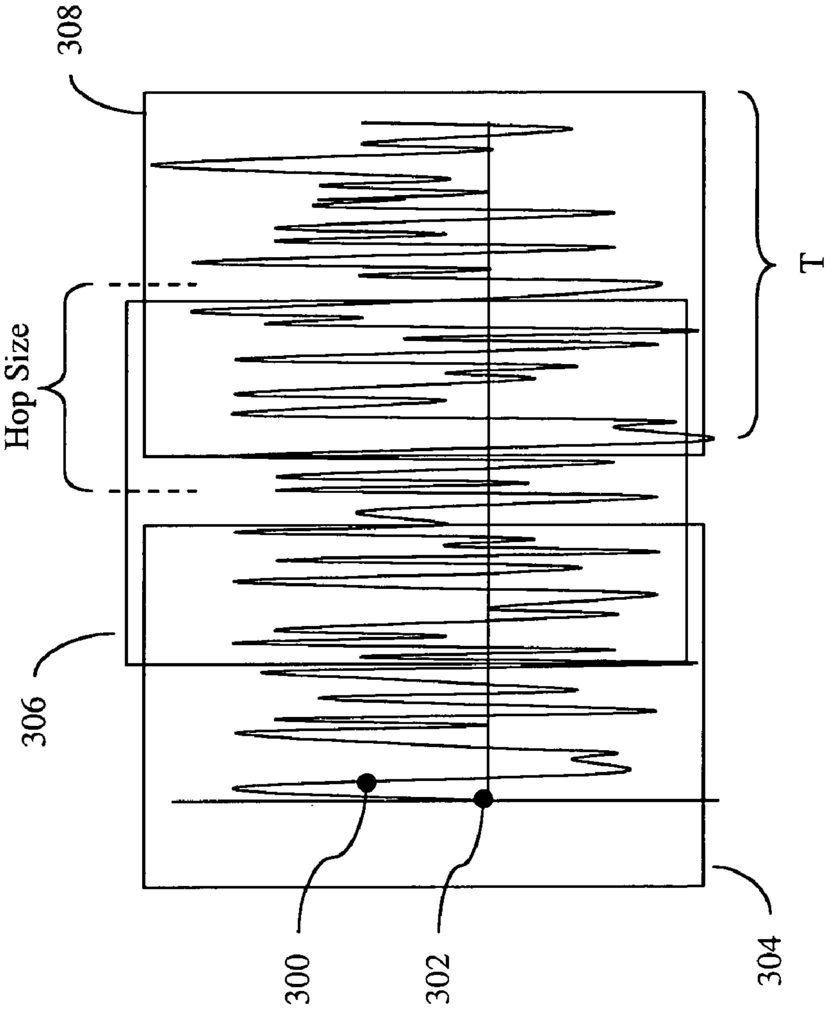
FIG. 3 is a diagram of segmenting according to the present invention.

FIG. 3 shows a diagram showing the segmenting of a work according to the present invention. FIG. 3 includes audio information 300 displayed along a time axis 302. FIG. 3 further includes a plurality of segments 304, 306, and 308 taken of audio information 300 over some segment size T.

In an exemplary non-limiting embodiment of the present invention, instantaneous values of a variety of acoustic features are computed at a low level, preferably about 100 times a second. Additionally, 10 MFCCs (cepstral coefficients) are computed for each segment. It is contemplated that any number of MFCCs may be computed. Preferably, 5-20 MFCCs are computed, however, as many as 30 MFCCs may be computed, depending on the need for accuracy versus speed.

In an exemplary non-limiting embodiment of the present invention, the segment-level acoustical features comprise statistical measures as disclosed in the '223 patent of these low-level features calculated over the length of each segment. The data structure may store other bookkeeping information as well (segment size, hop size, item ID, UPC, etc).

As can be seen by inspection of FIG. 3, the segments 304, 306, and 308 may overlap in time. This amount of overlap may be represented by measuring the time between the center point of adjacent segments. This amount of time is referred to herein as the hop size of the segments, and is so designated in FIG. 3. By way of example, if the segment length T of a given segment is one second, and adjacent segments overlap by 50%, the hop size would be 0.5 second.

The hop size may be set during the development of the software. Additionally, the hop sizes of the reference database and the real-time segments may be predetermined to facilitate compatibility. For example, the reference signatures in the reference database may be precomputed with a fixed hop and segment size, and thus the client applications should conform to this segment size and have a hop size which integrally divides the reference signature hop size. It is contemplated that one may experiment with a variety of segment sizes in order to balance the tradeoff of accuracy with speed of computation for a given application.

The inventors have found that by carefully choosing the hop size of the segments, the accuracy of the identification process may be significantly increased. Additionally, the inventors have found that the accuracy of the identification process may be increased if the hop size of reference segments and the hop size of segments obtained in real-time are each chosen independently. The importance of the hop size of segments may be illustrated by examining the process for segmenting pre-recorded works and real-time works separately.

Reference Signatures

Prior to attempting to identify a given work, a reference database of signatures must be created. When building a reference database, a segment length having a period of less than three seconds is preferred. In an exemplary non-limiting embodiment of the present invention, the segment lengths have a period ranging from 0.5 seconds to 3 seconds. For a reference database, the inventors have found that a hop size of approximately 50% to 100% of the segment size is preferred.

It is contemplated that the reference signatures may be stored on a database such as database 204 as described above. Database 204 and the discussion herein provide an example of means for providing a plurality of reference signatures each having a segment size and a hop size.

Real-Time Signatures

The choice of the hop size is important for real-time segments.

Figure 4:
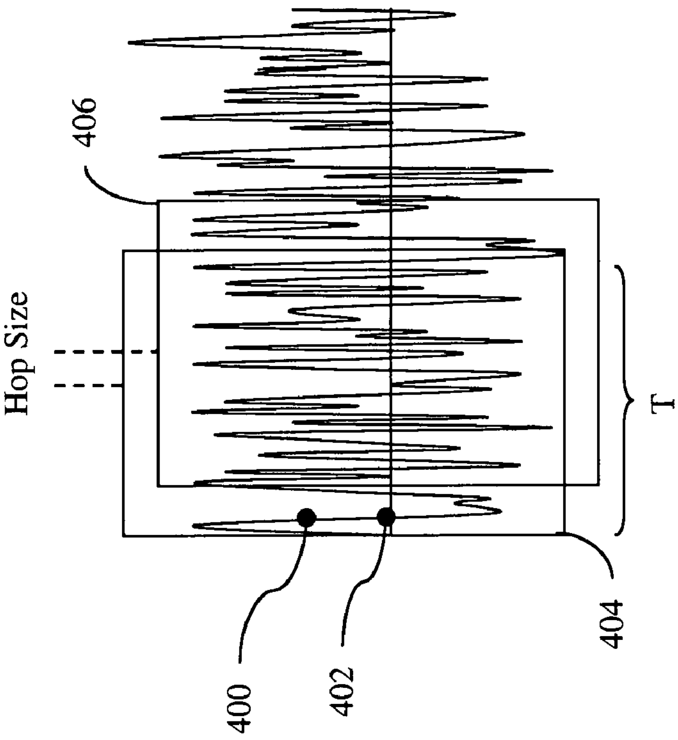
FIG. 4 is a detailed diagram of segmenting according to the present invention showing hop size.

FIG. 4 shows a detailed diagram of a real-time segment according to the present invention. FIG. 4 includes real-time audio information 400 displayed along a time axis 402. FIG. 4 further includes segments 404 and 406 taken of audio information 400 over some segment length T. In an exemplary non-limiting embodiment of the present invention, the segment length of real-time segments is chosen to range from 0.5 to 3 seconds.

As can be seen by inspection of FIG. 4, the hop size of real-time is chosen to be smaller than that of reference segments. In an exemplary non-limiting embodiment of the present invention, the hop size of real-time segments is less than 50% of the segment size. In yet another exemplary non-limiting embodiment of the present invention, the real-time hop size may be 0.1 seconds.

The inventors have found such a small hop size advantageous for the following reasons. The ultimate purpose of generating real-time segments is to analyze and compare them with the reference segments in the database to look for matches. The inventors have found at least two major reasons why a segment of the same audio recording captured real-time would not match its counterpart in the database. One is that the broadcast channel does not produce a perfect copy of the original. For example, the work may be edited or processed or the announcer may talk over part of the work. The other reason is that larger segment boundaries may not line up in time with the original segment boundaries of the target recordings.

The inventors have found that by choosing a smaller hop size, some of the segments will ultimately have time boundaries that line up with the original segments, notwithstanding the problems listed above. The segments that line up with a "clean" segment of the work may then be used to make an accurate comparison while those that do not so line up may be ignored. The inventors have found that a hop size of 0.1 seconds seems to be the maximum that would solve this time shifting problem.

Figure 5:
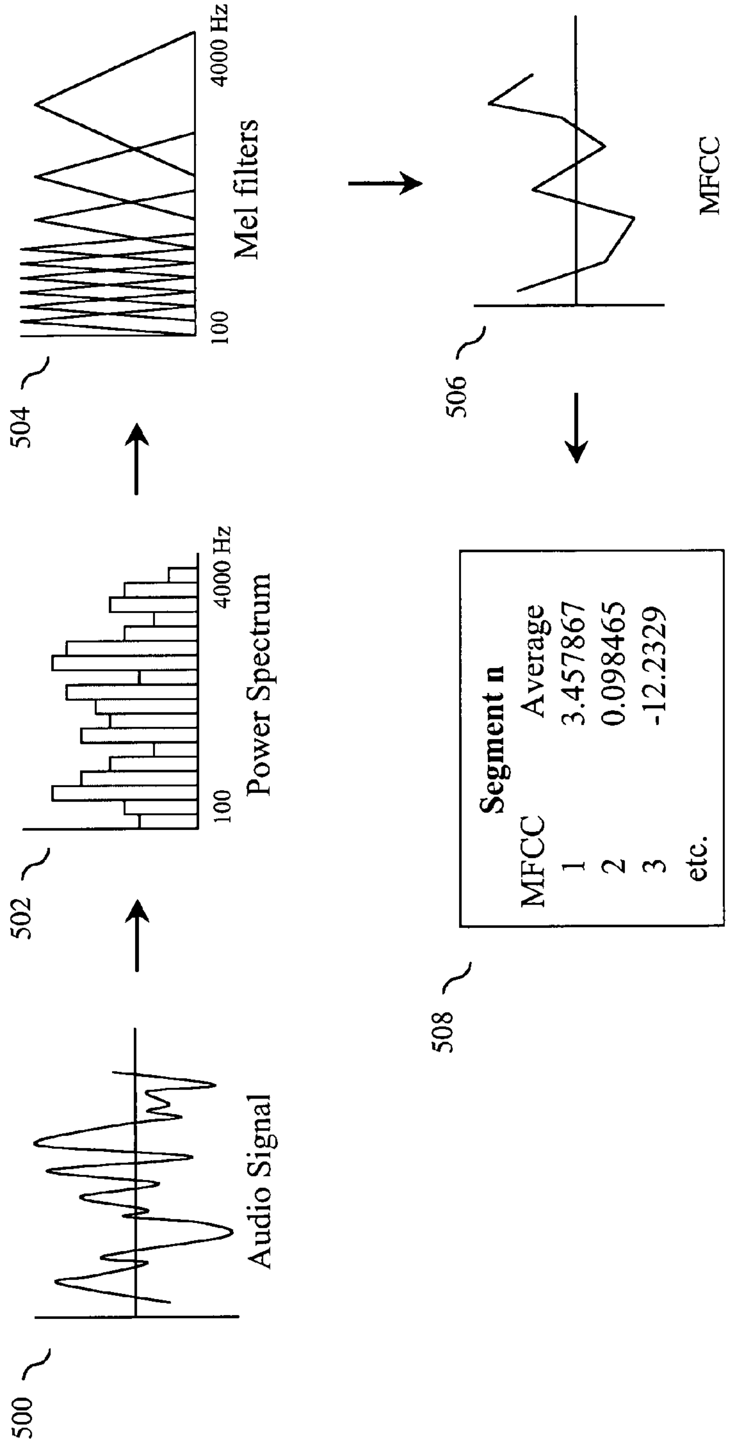
FIG. 5 is a graphical flowchart showing the creating of a segment feature vector according to the present invention.

As mentioned above, once a work has been segmented, the individual segments are then analyzed to produce a segment feature vector. FIG. 5 is a diagram showing an overview of how the segment feature vectors may be created using the methods described in U.S. Pat. No. 5,918,223 to Blum, et al. It is contemplated that a variety of analysis methods may be useful in the present invention, and many different features may be used to make up the feature vector. The inventors have found that the pitch, brightness, bandwidth, and loudness features of the '223 patent to be useful in the present invention. Additionally, spectral features may be used analyzed, such as the energy in various spectral bands. The inventors have found that the cepstral features (MFCCs) are very robust (more invariant) given the distortions typically introduced during broadcast, such as EQ, multi-band compression/limiting, and audio data compression techniques such as MP3 encoding/decoding, etc.

In act 500, the audio segment is sampled to produce a segment. In act 502, the sampled segment is then analyzed using Fourier Transform techniques to transform the signal into the frequency domain. In act 504, mel frequency filters are applied to the transformed signal to extract the significant audible characteristics of the spectrum. In act 506, a Discrete Cosine Transform is applied which converts the signal into mel frequency cepstral coefficients (MFCCs). Finally, in act 508, the MFCCs are then averaged over a predetermined period. In an exemplary non-limiting embodiment of the present invention, this period is approximately one second. Additionally, other characteristics may be computed at this time, such as brightness or loudness. A segment feature vector is then produced which contains a list containing at least the 10 MFCCs corresponding average.

The disclosure of FIGS. 3, 4, and 5 provide examples of means for creating a signature of a sampled work having a segment size and a hop size.

Figure 6:
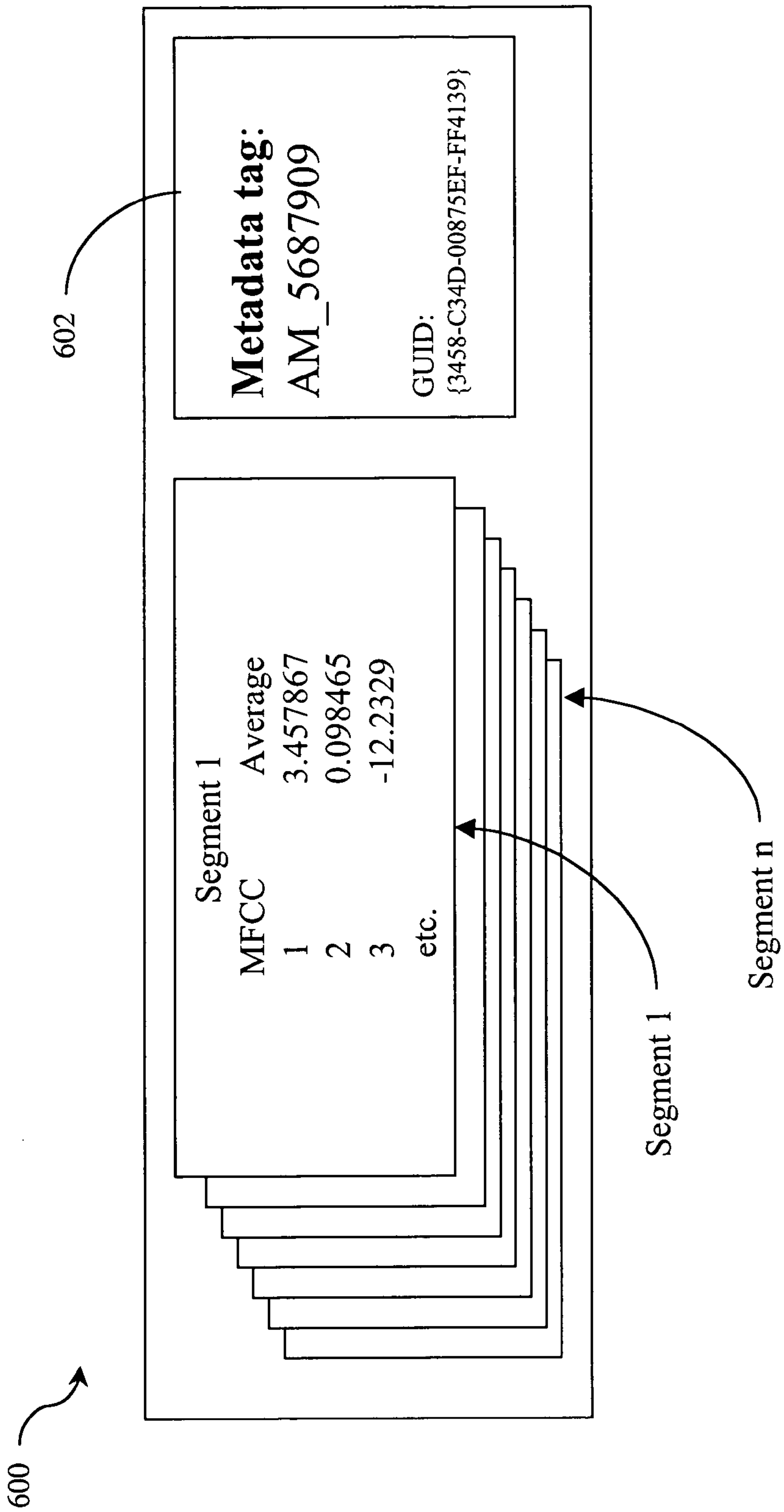
FIG. 6 is a diagram of a signature according to the present invention.

FIG. 6 is a diagram showing a complete signature 600 according to the present invention. Signature 600 includes a plurality of segment feature vectors 1 through n generated as shown and described above. Signature 600 may also include an identification portion containing a unique ID. It is contemplated that the identification portion may contain a unique identifier provided by the RIAA (Recording Industry Association of America). The identification portion may also contain information such as the UPC (Universal Product Code) of the various products that contain the audio corresponding to this signature. Additionally, it is contemplated that the signature 600 may also contain information pertaining to the characteristics of the file itself, such as the hop size, segment size, number of segments, etc., which may be useful for storing and indexing.

Signature 600 may then be stored in a database and used for comparisons.

The following computer code in the C programming language provides an example of a database structure in memory according to the present invention:

```
typedef struct
{
        float     hopSize;                 /* hop size */
        float     segmentSize;             /* segment size */
        MFSignature* signatures;           /* array of signatures */
} MFDatabase;
```

The following provides an example of the structure of a segment according to the present invention:

```
typedef struct
{
        char*   id;                /* unique ID for this audio clip */
        long    numSegments;       /* number of segments */
        float*  features;          /* feature array */
        long    size;              /* size of per-segment feature vector */
        float   hopSize;
        float   segmentSize;
} MFSignature;
```

The discussion of FIG. 6 provides an example of means for storing segments and signatures according to the present invention.

Figure 7:
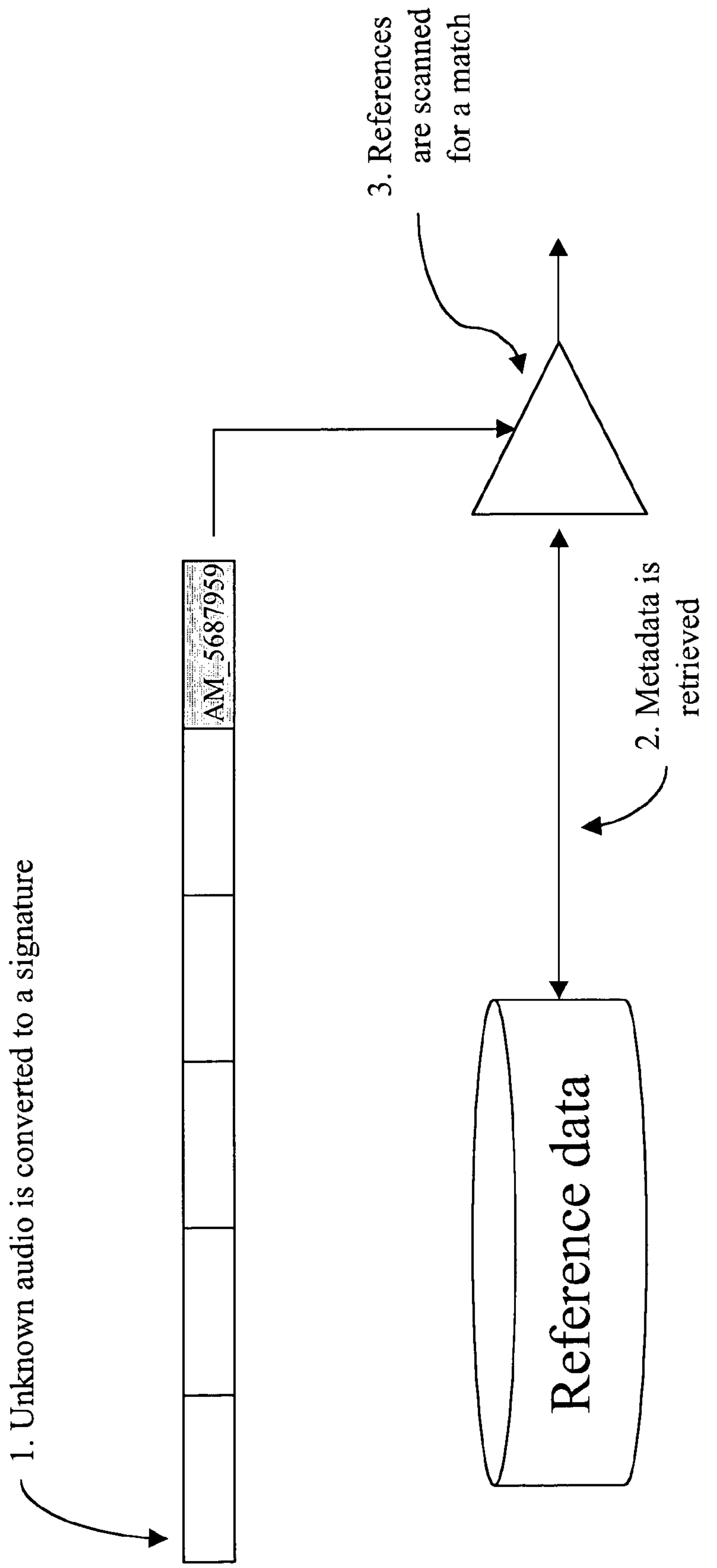
FIG. 7 is a functional diagram of a comparison process according to the present invention.

FIG. 7 shows a functional diagram of a comparison process according to the present invention. Act 1 of FIG. 7 shows unknown audio being converted to a signature according to the present invention. In act 2, reference signatures are retrieved from a reference database. Finally, the reference signatures are scanned and compared to the unknown audio signatures to determine whether a match exists. This comparison may be accomplished through means known in the art. For example, the Euclidean distance between the reference and real-time signature can be computed and compared to a threshold.

It is contemplated that the present invention has many beneficial uses, including many outside of the music piracy area. For example, the present invention may be used to verify royalty payments. The verification may take place at the source or the listener. Also, the present invention may be utilized for the auditing of advertisements, or collecting Arbitron®-like data (who is listening to what). The present invention may also be used to label the audio recordings on a user's hard disk or on the web.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. An apparatus that determines an identity of an unknown sampled work, said apparatus comprising:

a database to store a plurality of reference signatures of each of a plurality of reference works wherein said plurality of reference signatures of each of said plurality of reference works are created from a plurality of segments of said each of said plurality of reference works having a known segment size and a known hop size, wherein said predetermined hop size of each of said plurality of segments of said unknown sampled work is less than said known hop size; and a processor coupled to the database to receive data of said unknown sampled work, to segment said data of said unknown sampled work into a plurality of segments wherein each of said segments has a predetermined segment size and a predetermined hop size, to create a plurality of signatures of said unknown sampled work based upon said plurality of segments of said unknown sampled work, wherein each of said plurality of signatures is of said predetermined segment size and said predetermined hop size, to compare said plurality of signatures of said unknown sampled work to a plurality of reference signatures of each of a plurality of reference works created from a plurality of sample segments of each of said plurality of reference works, each of said plurality of reference signatures of each of said plurality of reference works having a known segment size and a known hop size wherein said predetermined hop size of said each of said plurality of segments of said unknown sampled work is less than said known hop size, and to identify said unknown sampled work is one of said reference works based upon said comparison.

2. The apparatus of claim 1, wherein said processor to create a plurality of signatures of said unknown sampled work is further to calculate segment feature vectors for each of said plurality of segments of said unknown sampled work.

3. The apparatus of claim 1, wherein said processor to create a plurality of signatures of said unknown sampled work is further to calculate a plurality of MFCCs for each said segment.

4. The apparatus of claim 1, wherein said processor to create a plurality of signatures of said unknown sampled work is further to calculate one of plurality of acoustical features selected from a group consisting of loudness, pitch, brightness, bandwidth, spectrum and MFCC coefficients for each of said plurality of segments of said unknown sampled work.

5. The apparatus of claim 1, wherein said unknown sampled work signature comprises a plurality of segments and an identification portion.

6. The apparatus of claim 1, wherein said plurality of segments of said unknown sampled work comprise said predetermined segment size of approximately 0.5 to 3 seconds.

7. The apparatus of claim 6, wherein said predetermined hop size of said plurality of segments of said unknown sampled work signature is less than 50% of the segment size.

8. The apparatus of claim 6, wherein said predetermined hop size of each of said plurality of segments of said unknown sampled work signature is approximately 0.1 seconds.

* * * * *